United States Patent [19]
December et al.

[11] Patent Number: 6,048,443
[45] Date of Patent: Apr. 11, 2000

[54] LOW BAKE CATHODIC ELECTROCOAT HAVING DUAL CURE MECHANISM

[75] Inventors: Timothy S. December, Rochester; Walter H Ohrbom, Hartland Township; Gregory G. Menovcik, Farmington Hills, all of Mich.

[73] Assignee: BASF Corporation, Southfield, Mich.

[21] Appl. No.: 09/217,565

[22] Filed: Dec. 21, 1998

[51] Int. Cl.[7] .................................................. C25D 13/04
[52] U.S. Cl. ........................... 204/506; 525/481; 525/510
[58] Field of Search .................................. 204/500, 506; 525/481, 510

[56] References Cited

U.S. PATENT DOCUMENTS

| | | | |
|---|---|---|---|
| 3,479,328 | 11/1969 | Nordstrom | 260/86.1 |
| 3,639,657 | 2/1972 | Moran et al. | 260/47 N |
| 3,674,838 | 7/1972 | Nordstrom | 260/482 |
| 4,126,747 | 11/1978 | Cowherd, III et al. | 520/166 |
| 4,279,833 | 7/1981 | Culbertson et al. | 260/464 |
| 4,340,497 | 7/1982 | Knopf | 560/24 |
| 5,075,386 | 12/1991 | Vanderbilt | 525/65 |
| 5,356,669 | 10/1994 | Rehfuss et al. | 427/409 |
| 5,431,791 | 7/1995 | December et al. | 204/181.7 |
| 5,527,614 | 6/1996 | Carpenter et al. | 204/502 |
| 5,552,497 | 9/1996 | Taylor et al. | 525/456 |
| 5,559,195 | 9/1996 | McGee et al. | 525/383 |
| 5,576,063 | 11/1996 | Briggs et al. | 427/386 |
| 5,659,003 | 8/1997 | Menovcik et al. | 528/73 |
| 5,693,723 | 12/1997 | Green | 525/481 |
| 5,693,724 | 12/1997 | Green | 525/481 |
| 5,723,552 | 3/1998 | Menovcik et al. | 525/453 |
| 5,726,246 | 3/1998 | Rehfuss et al. | 525/100 |
| 5,766,769 | 6/1998 | Ohrbom et al. | 525/453 |
| 5,827,931 | 10/1998 | Menovcik et al. | 525/453 |

FOREIGN PATENT DOCUMENTS 0 440 583 A2  8/1991  European Pat. Off. .

OTHER PUBLICATIONS

Marcia Agostinho & Vincent Brytus, "A high solids one–component, low temperature bake epoxy Coating," J. Coating Tech., Sep. 1988, at 61.

Primary Examiner—Kishor Mayekar
Attorney, Agent, or Firm—Mary E. Golota

[57] ABSTRACT

The invention provides cathodic electrocoat compositions having a carbamate functional resin with a cationic salting site, a crosslinking agent reactive with the carbamate functional resin and a carbonate curing agent. The invention also provides methods of cathodically electrodepositing a coating on a substrate using the coating compositions of the invention. The compositions of the invention provide urethane crosslinking sites without the use of disadvantageous blocked isocyanates and cure at temperatures lower than prior art cathodic electrocoat compositions.

19 Claims, No Drawings

LOW BAKE CATHODIC ELECTROCOAT HAVING DUAL CURE MECHANISM

FIELD OF THE INVENTION

The present invention relates to coating compositions for use in cathodic electrodeposition coating processes and methods of cathodic electrodeposition. More particularly, the invention provides cathodic electrocoat compositions having a carbamate functional resin with a pendant cationic salting group, a crosslinking agent reactive with the carbamate functional resin and a carbonate curing agent. The invention also provides methods of cathodically electrodepositing a coating on a substrate using the coating compositions of the invention.

BACKGROUND OF THE INVENTION

Coating compositions are widely in use today which utilize a variety of cure mechanisms. Among these are anodic and cathodic electrodeposition coating compositions and methods.

During electrodeposition, an ionically-charged polymer having a relatively low molecular weight is deposited onto a conductive substrate by submerging the substrate in an electrocoat bath having dispersed therein the charged resin, and applying an electrical potential between the substrate and a pole of opposite charge, usually a stainless steel electrode. This produces a relatively soft coating of low molecular weight on the substrate. This coating is usually converted to a hard high molecular weight coating by during or crosslinking of the resin.

One curing mechanism utilizes a melamine formaldehyde polymer-curing agent in the electrodepositable coating composition to react with hydroxyl functional groups on the electrodeposited resin. This curing method provides good cure at relatively low temperatures (e.g., 132° C.), but the crosslinked bonds contain undesirable ether linkages and the resulting coatings provide poor overall corrosion resistance.

In order to address some of the problems with melamine-crosslinked electrocoats, many users employ polyisocyanate crosslinkers to react with hydroxyl functional groups on the electrodeposited resin. This curing method provides desirable urethane crosslink bonds, but it also entails several disadvantages. In order to prevent premature gelation of the electrodepositable coating composition, the highly reactive isocyanate groups on the curing agent must be blocked (e.g., with an oxime, lactam, or alcohol).

Blocked polyisocyanates, however, require high temperatures (e.g., 176° C. or more) to unblock and begin the curing reaction. The resulting electrocoats can also be susceptible to yellowing. Moreover, the volatile blocking agents released during cure can cause other deleterious effects on various coating properties, as well as increasing VOC. In addition, use of some the volatile blocking agents may give rise to environmental concerns. Finally, the volatile blocking agents account for significant and disadvantageous weight loss upon crosslinking.

There is thus a need in the art for electrodepositable coating compositions that can provide desirable urethane crosslink linkages, but avoid the problems that accompany the use of blocked polyisocyanate curing agents. In particular, it is desirable to provide a cathodic electrodeposition coating composition capable of providing urethane linkages at low bake temperatures of 121° C. or less with decreased weight loss upon crosslinking, while being free of isocyanates and the volatile blocking agents used with isocyanates.

SUMMARY OF THE INVENTION

The foregoing objects are achieved with a cathodic electrocoat coating composition comprising an aqueous dispersion of a polymer (a) comprising a polymer backbone having appended thereto at least one carbamate functional group, said polymer (a) represented by randomly repeating units according to the formula:

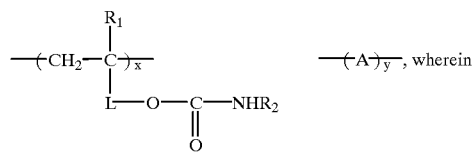

$R_1$ represents H or $CH_3$, $R_2$ represents H, alkyl, or cycloalkyl, L represents a divalent linking group, A represents repeat units comprising at least one repeat unit having a pendant primary amine group salted with an acid, x represents 10 to 90 weight %, y represents 90 to 10 weight %, (b) a compound having a plurality of functional groups that are reactive with said carbamate groups, and (c) a curing agent having a plurality of cyclic carbonate groups.

Finally, the invention provides a cathodic electrodeposition method requiring 1) immersing a conductive substrate in a coating composition comprising, in an aqueous medium: (a) a polymer backbone having appended thereto at least one carbamate functional group, said polymer represented by randomly repeating units according to the formula:

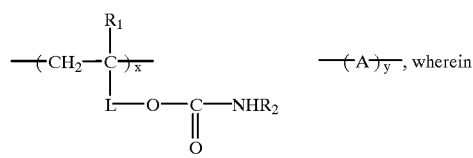

$R_1$ represents H or $CH_3$, $R_2$ represents H, alkyl, or cycloalkyl, L represents a divalent linking group, A comprises repeat units comprising at least one repeat unit having a pendant primary amine group salted with an acid, x represents 10 to 90 weight %, and y represents 90 to 10 weight %, (b) a compound having a plurality of functional groups that are reactive with said carbamate groups, and (c) a curing agent having a plurality of cyclic carbonate groups, 2) applying a voltage between an anode and the conductive substrate, and 3) removing the substrate from the coating composition.

DETAILED DESCRIPTION OF THE INVENTION

The polymer (a) of the invention will have at least one carbamate functional group appended to a polymer backbone, preferably a plurality of pendant carbamate functional groups. It is preferred, but not necessary, that the polymer backbone to which the carbamate functional group is appended be an acrylic polymer.

Polymer (a) of the invention can be prepared in a variety of ways.

One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The resulting carbamate functional acrylic monomer can then be polymerized along with other ethylenically-unsaturated monomers, if desired, by techniques well-known in the art.

The polymer (a) of the invention must have at least one repeating unit A having at least one primary amine group. The primary amine group may be, and is preferably, blocked by a ketone to form a ketamine group. The primary amine group may be part of a polyamine, i.e., a secondary amine comprising one or more primary amines. The at least one repeating unit A may further comprise more than one primary amine group. Preferably, the at least one repeating unit A will comprise a secondary or tertiary amine comprising at least one primary amine group blocked with a ketone to form a ketamine group.

The primary amine group of the at least one repeat unit A will be salted with an acid to produce a salt, which, while in an aqueous dispersion in the presence of a voltage, will undergo decomposition and facilitate the formation of a insoluble polymer which deposits on a substrate immersed in the aqueous dispersion.

The primary amine group can be incorporated into or grafted to the polymer backbone in a variety of ways.

For example, a carbamate functional acrylic monomer can be copolymerized with an ethylenically unsaturated monomer having at least one amine group which is a primary amine group. Illustrative examples of such monomers are methacrylamide and acrylamide.

Alternatively, as will be discussed below, a polymer having oxirane or glycidyl functionality can be made and the pendant primary amine group formed by reaction of the glycidyl group with a primary amine or a polyamine having at least one primary amine group. Polyamines may be used which comprise at least one primary amine, and one or more secondary or tertiary amine groups or mixtures thereof. Preferred monomers are NH(CH₂CH₂NH₂)₂ and diethylenetriamine (DETA), especially when the primary amine groups are blocked with ketones to form ketamine groups.

Finally, a monomer such as glycidyl methacrylate can be reacted with a carbamate functional monomer to produce an carbamate functional acrylic having pendant glycidyl functionality. A pendant primary amine group can be incorporated by reaction of a polyamine such as is described above with the oxirane group.

Preferred methods of preparing the polymer (a) of the invention having an acrylic backbone include the following.

An adduct may be made from a polyisocyanate such as isophorone diisocyanate (IPDI) or toluene diisocyanate (TDI) and a hydroxy functional carbamate compound such as hydroxypropyl carbamate. The resulting adduct can then be grafted onto a suitable acrylic, epoxy or other hydroxy functional resin so long as such resin comprises a pendant primary amine group or a group convertible to such.

Another method involves a multistep reaction wherein a hydroxy carbonate may reacted with ammonia or an amine functional compound to provide a primary amine and carbamate functional compound. This compound is then reacted with an anhydride compound via the reaction of the hydroxy group with the anhydride ring. The carboxylic acid groups of the resultign reaction product are then reacted with the oxirane groups of a glycidyl ether of Bisphenol A. Primary amine groups may be incorporated via the reaction of an amine functional compound, such as diethylene triamine, with the glycidyl ether groups which terminate the resulting hydroxy and carbamate functional polymer.

In an alternative reaction, an isocyanate functional monomer such as unsaturated m-tetramethyl xylene isocyanate (sold by American Cyanamid as TMI®) can be copolymerized with monomers such as alkyl esters such as butyl acrylate and unsaturated monomers such as styrene to produce an isocyanate functional polymer. The required primary group functionality and carbamate functionality can then be grafted onto the isocyanate functional polymer by a multi-stage reaction having a first stage using a carbamate functional monomer such as hydroxypropyl carbamate followed by a second stage using an amine functional compound, i.e., having at least one primary amine group, most preferably an alkanol amine having a primary amine group.

A most preferred method of making the polymer (a) of the invention involves the production of an epoxy based resin, i.e., for example a resin derived from the diglycidyl ether of bisphenol A, bisphenol A, and phenol. This resin is then capped with an amine having at least one primary amine group, such as diethylene triamine (DETA) or the diketamine thereof. In a preferred embodiment, a mixture of the diketamine of DETA and methylethanolamine is used.

The polymer component (a) can be represented by the randomly repeating units according to the following formula:

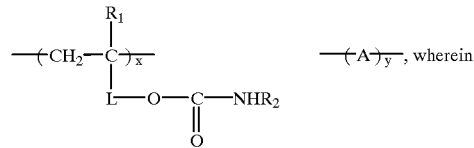

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers, at least one of which repeat units must have at least one pendant primary amine group. As discussed above, the at least one pendant primary amine group may derive from the use of at least one ethylenically unsaturated monomer having at least one amino group. Alternatively, the at least one repeating unit having a pendant primary amine group may derive from the reaction of a polyamine with a glycidyl group previously incorporated into the polymer.

Other monomers which may be utilitzed to provide repeating units (A) not having pendant amino functionality are those monomers for copolymerization with acrylic monomers known in the art. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an alipliatic of 1 to 8 carbon atoms, cycloaliphatic, or aromatic linking group of 6 to 10 carbon atoms. Examples of L include

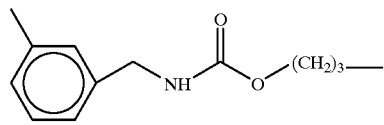

$-(CH_2)-$, $-(CH_2)_2-$, $-(CH_2)_4-$, and the like. In one preferred embodiment, $-L-$ is represented by $-COO-L'-$ where L' is a divalent linking group. Thus, in one embodiment of the invention, the polymer component (a) is represented by randomly repeating units according to the following formula:

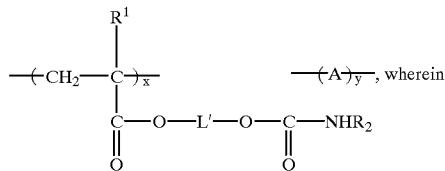

In this formula, $R_1$, $R_2$, A, x, and y are as defined above. L' may be a divalent alipliatic linking group, preferably of 1 to 8 carbon atoms, e.g., $-(CH_2)-$, $-(CH_2)_2-$, $-(CH_2)_4-$, and the like, or a divalent cycloaliphatic linking group, preferably up to 8 carbon atoms, e.g., cyclohexyl, and the like. However, other divalent linking groups can be used, depending on the technique used to prepare the polymer. For example, in a most preferred embodiment, a hydroxyalkyl carbamate is adducted onto an isocyanate-functional acrylic polymer, so that the linking group L' includes an $-NHCOO-$ urethane linkage as a residue of the isocyanate group. Of course, at least one repeating group A will comprise at least one pendant primary amino groups as discussed above.

The polymer (a) will generally have a number average molecular weight of 2000–100,000, and preferably from 10,000–60,000. Molecular weight can be determined by the GPC method using a polystyrene standard. The glass transition temperature, $T_g$, of components (a) and (b) can be adjusted to achieve a cured coating having the $T_g$ for the particular application involved. The average $T_g$ of unreacted components (a) and (b) should be between 0° C. and 100° C., with the individual $T_g$'s being adjusted to achieve optimum performance.

Polymer (a) may be further characterized by a meq of primary amine group, of from about 0.5 to 2.0 meq N/gram polymer (a), preferably from about 0.8 to 1.5 meq N/gram polymer (a), and most preferably from about 1.0 to 1.2 meq N/gram polymer (a). Polymer (a) should also have a carbamate equivalent weight (grams of polymer (a)/equivalent of carbamate) of from 150 to 1200, preferably from 200 to 600, and most preferably from 300 to 400.

It will appreciated that the various monomers and/or reactants used to make polymer (a) will be used in amounts necessary to obtain the meq N, molecular weight and carbamate equivalent weight.

The cathodic coating composition of the invention also comprises a curing agent (b). Curing agent (b) is a compound having a plurality of functional groups that are reactive with the carbamate groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

The coating composition of the present invention also comprises a component (c) that is a curing agent having a plurality of cyclic carbonate groups. Cyclic carbonate compounds are well-known in the art. The component (c) may comprise cyclic carbonate groups having various ring sizes as are known in the art, such as five-membered cyclic carbonate rings, six-membered cyclic carbonate rings, seven-membered cyclic carbonate rings, or fused ring systems containing the characteristic $-O-CO-O-$ carbonate moiety.

Cyclic carbonate compounds can be synthesized by any of several different approaches. One approach involves reacting an epoxy group-containing compound with $CO_2$, preferably under pressure with a catalyst. Useful catalysts include any that activate an oxirane ring, such as tertiary amine quaternary salts (e.g., tetramethyl ammonium bromide), tin and/or phosphorous complex salts (e.g., $(CH_3)_3SNI$, $(CH_3)_4PI$). Epoxides can also be reacted with β-butyrolactone in the presence of such catalysts. In another approach, a glycol like glycerine is reacted at temperatures of at least 80° C. (usually under reflux) with diethyl carbonate in the presence of a catalyst (e.g., potassium carbonate) to form a cyclic carbonate. Alternatively, a functional compound containing a ketal of a 1,2-diol having the structure:

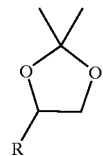

can be ring-opened with water at temperatures of at least 60° C., preferably with a trace amount of acid, to form a 1,2-glycol. As an alternative to reaction with diethyl carbonate, glycols can be reacted with phosgene in the presence of sodium hydroxide to form a cyclic carbonate. Five-membered cyclic carbonate rings can be formed from 1,2-glycols. Six-membered cyclic carbonate rings can be formed from 1,3-glycols. Fused rings may be formed, for example, by the reaction of phenol with phosgene to form phenylene carbonate.

Cyclic carbonates typically have 5-6-membered rings, as is known in the art. Five-membered rings are preferred, due to their ease of synthesis and greater degree of commercial availability.

In a preferred embodiment, compounds useful as component (c) are prepared by reaction of a polyepoxide with carbon dioxide to convert the epoxy groups to cyclic carbonate groups. Polyepoxides are well-known in the art. Polyepoxides useful for preparing component (c) compounds include the trimethylol propane that has been epoxidized by reaction with an epihalohydrin, and also epoxy-novolacs. Oligomeric or polymeric polyepoxides, such as acrylic polymers or oligomers containing glycidyl methacrylate or epoxy-terminated polyglycidyl ethers, can also be used. Other polyepoxides, e.g., epoxy-novolacs, may also be used. As with other polyepoxides, epoxy-novolacs can be reacted with carbon dioxide to form the cyclic carbonate crosslinker.

Cyclic carbonates with a functionality higher than 3 are also contemplated and, in many cases, are preferred. For example, the isocyanate groups on a diisocyanate such as isophorone diisocyanate may be adducted with a polyol such as trimethylol propane to produce a tetrafunctional alcohol, which can be epoxidized with an epihalohydrin to produce a tetrafunctional polyepoxide, which is in turn reacted with carbon dioxide to form a tetrafunctional cyclic carbonate. Other higher-functionality polyepoxides, e.g., tetrakis(4-glycidyloxy-phenyl)ethane, may also be reacted with $CO_2$ to form poly-cyclic carbonates. Even substantially higher functionalities can be used, such as polymeric polyepoxides converted to polymeric cyclic carbonate compounds, where the functionality will be a function of the equivalent weight of the polymer.

One preferred class of cyclic carbonate compounds useful as component (c) are compounds having at lease one polyether segment and/or at at least four cyclic carbonate groups. In another preferred embodiment, each cyclic carbonate group is appended to a polyether segment. Such cyclic carbonate compounds may be prepared by reacting a polyether polyol with an epihalohydrin to convert the hydroxyl groups to epoxy groups. The epoxy groups may then be converted to cyclic carbonate groups by reaction with $CO_2$, as described above. Examples of useful polyether polyols include compounds of the formula:

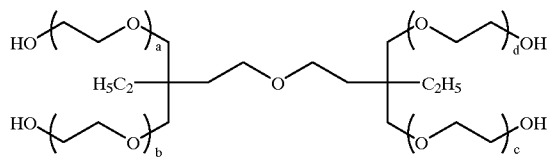

where $a+b+c+d=3$ or where $a+b+c+d=5$ or where $a+b+c+d=7$.

One route for the preparation of cyclic ring carbonates can be represented by the formula:

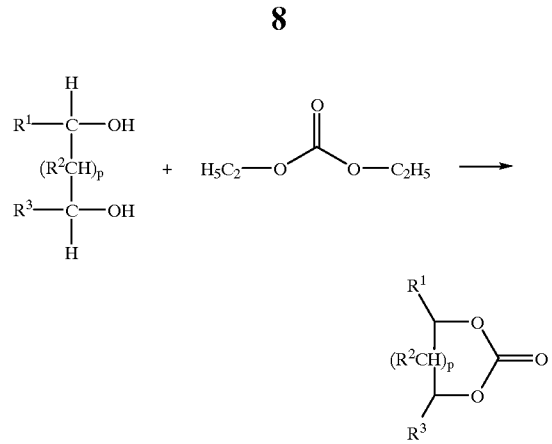

where p is 0 or a positive integer (preferably 0, 1, or 2) and $R^1$, $R^2$, and $R^3$ are each independently H or an organic radical with the proviso that at least one of $R^1$, $R^2$, and $R^3$ is an organic radical to which other cyclic carbonate groups can be attached or a group capable of bonding to an organic radical to which other cyclic carbonate groups can be attached.

In one preferred embodiment of the invention, component (c) compounds are represented by the formula:

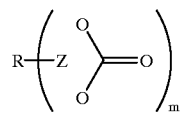

where R represents an organic radical, Z represents the carbon atoms necessary to complete a substituted or unsubstituted five-, six-, or seven-membered cyclic carbonate ring, and m represents an integer of at least 2.

In another preferred embodiment of the invention, component (c) compounds are represented by the formula:

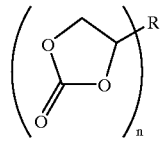

where R represents an organic radical and n is 2 to 8, preferably 2 to 6, and more preferably 3 or 4.

Polymer (a) when reacted with an acid is water-dispersible and is useful in electrodeposition processes, especially when incorporated into an emulsion or dispersion. The aqueous dispersion of polymer (a) should be neutralized to a degree sufficient to (i) form an emulsion micelle of less than 0.50 μm, preferably less than 0.20 μm, and (ii) provide emulsion stability in the electrocoat deposition bath.

Electrodepositable coating compositions are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.05 to 5.0 microns, preferably less than 2.0 microns.

The concentration of the polymer (a) in the aqueous medium is, in general, not critical, but ordinarily the major portion of the aqueous dispersion is water. The aqueous dispersion usually contains from about 3 to 50 percent, preferably 10 to 40 percent by weight resin solids. Aqueous resin concentrates which are to be further diluted with water, generally range from 10 to 30 percent by total weight solids.

Polymer (a) is preferably reacted with an acid for use in the cathodic electrocoat coating composition of the invention. This reaction may be termed "neutralization or "acid-salted" and specifically refers to the reaction of the pendant amino groups with an acidic compound in an amount sufficient to neutralize enough of the basic amino groups to impart water-dispersibility to polymer (a). Illustrative acid compounds include phosphoric acid, propionic acid, acetic acid, lactic acid, or citric acid.

The coating composition of the invention can further contain catalysts to facilitate the reaction between polymer (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts useful in the composition of the invention include Lewis acids, zinc salts, and tin salts. An illustrative Lewis acid or zinc salt is zinc nitrate and the like. Such catalysts will typically be used in an amount of from 0.1 to 3.0 weight percent, based on the resin solids, preferably from 0.5 to 2.0 weight percent, based on the resin solids.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

Electrodeposition coating compositions may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

Electrodeposition coating compositions may be applied on a conductive substrate by the electrodeposition coating process at a nonvolatile content of 10 to 25% by weight to a dry film thickness of 15 to 35 microns. After application, the coating may be cured at an elevated temperature, depending upon the nature of particular base resins. Prior art anodic electrodeposition coating typically cure at approximately 20 minutes at 350° F. (metal temperature). The cathodic electrodeposition coating compositions of the invention cure at 20 minutes at 250° F. or less (metal temperature), preferably at 20 minutes at 200° F. (metal temperature).

It will be appreciated that the method of cathodic deposition of the invention may further comprise rinsing and baking the coated substrate after removal from the coating composition bath.

Electrodeposition of the coating preparations according to the invention may be carried out by any of a number of processes known to those skilled in the art. The deposition may be carried out on all electrically conducting substrates, for example metal, such as steel, copper, aluminum and the like.

In a preferred embodiment, the cathodic electrodeposition method of the invention will be used to provide a first layer of electrodeposited coating. In such a case, a second electrodeposited coating will be applied subsequent to the application of the cathodically applied electrodeposition coating. Preferably, the second electrodeposited coating will be an anodically electrodeposited coating composition.

A pigmented resin coating and optionally a clearcoat layer may be applied over primer layers, including electrocoat primer layers. In automotive applications, the pigmented resin layer is often called a basecoat or pigmented basecoat. The resin in the pigmented resin layer can be of a number of resins known in the art. For example, the resin can be an acrylic, a polyurethane, or a polyester. Typical pigmented resin coating formulations are described in U.S. Pat. Nos. 4,791,168, 4,414,357, and 4,546,046, the disclosures of which are incorporated herein by reference. In one preferred embodiment, the resin is an ε-caprolactone-modified acrylic resin, as described in U.S. Pat. No. 4,720,528, the disclosure of which is incorporated herein by reference. The pigmented resin can be cured by any of the known mechanisms and curing agents, such as a melamine polyol reaction (e.g., melamine cure of a hydroxy-functional acrylic resin).

Other pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. Basecoat polymers are preferably crosslinkable, and thus comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

After an article is coated with the above-described layers, the composition is subjected to conditions so as to cure the coating layers. Although various methods of curing may be used, including curing at ambient conditions, heat-curing is preferred because it has added benefits, such as driving off residual water or solvent from the coating composition. Generally, heat curing is effected by exposing the coated article to elevated temperatures provided primarily by radiative heat sources. Curing temperatures will vary depending on the particular blocking groups used in the cross-linking agents, however they generally range between 90° C. and 200° C., preferably between 121° C. and 162° C., and most preferably between 121° C. and 141° C. The curing time will vary depending on the particular components used, and physical parameters such as the thickness of the layers, however, typical curing times range from 15 to 60 minutes.

The invention is further described in the following non-limiting examples.

EXAMPLE 1

Preparation a Carbamate Functional Resin

Part A

To a 1000 ml flask equipped with a mixer, condenser, temperature probe and addition funnel were added 444.6 g (2 moles) isophorone diisocyanate (IPDI) and 0.45 g dibutyl tin dilaurate. To the addition funnel were added 238.0 grams (2 moles) of hydroxypropyl carbamate (HPC). The HPC was added to the IPDI dropwise while maintaining the temperature between 26–36° C. The final product had a NCO equivalent weight of 341.

Part B

To a 2000 ml flask equipped with a mixer, condenser and temperature probe were added 376 g diglycidyl ether of bisphenol A, 142.5 g bisphenol A, 23.5 g phenol and 29 g xylene. The reaction was heated to 120 C. and 0.4 g triphenylphosine was added. The reaction exotherms and temperature were maintained at 152° C. until the weight per epoxy was 1100. 79 g of MIBK was added to cool the reaction from 152° C. to 108° C. 208 g of the IPD/HPC adduct from Part A, and 1.0 g dibutyl tin dilaurate were then added. 20.0 g propylene glycol phenyl ether and 20.0 g propylene glycol propyl ether were then added. Upon cooling to 93° C., 76.2 g of the diketimine of diethylene triamine (DETA)(KT-22 from Air Products) and 22.5 methylethanolamine were added. The resin was reduced to 78% solids with 33 g iso-butanol. For crosslinking sites the polymer had a carbamate equivalent weight of 844 g polymer NV/eq carbamate functionality. For cathodic emulsification the polymer had a meq base of 1.1 grams polymer/N salting site.

EXAMPLE 2

Preparation of Pigment Grind Paste

Part A

To a 12 l flask, the following materials were added: 2125 grams of the diglycidylether of bisphenol A, 644 grams of bisphenol A, 370 grams of dodecylphenol and 162 grams of xylene. The mixture was heated to 1250° C., and 3.1 grams of triphenylphosphine were added. The reaction temperature was increased to 130° C. and maintained for 3 hours. The reaction was cooled by the addition of 795 grams ethylene glycol monobutyl ether and 1907 grams of propyleneglycol glycidyl ether. The remaining epoxy was capped by the addition of 218 grams of 2-aminoethoxyethanol and 173 grams of dime-thyaminopropylamine. The temperature was maintained at 110° C. for 4 hours. The temperature was then decreased to 70° C. and 164 grams acetic acid, and 1439 grams of deionized water were added. In a separate vessel, the resulting resin was diluted with 6000 grams of deionized water.

Part B

To an appropriate vessel, the following were added: 10,700 grams of the resin from Part A of Example 2, 325 grams carbon black, 542 grams dibutyltin oxide, 379 grams lead silicate, 1625 grams clay, 8504 grams titanium dioxide, and 2574 grams deionized water. These ingredients were mixed under a high shear and then milled. The paste was then diluted with 2000 grams of deionized water.

EXAMPLE 3

Preparation of Carbonate Crosslinker

Trimethylolpropanetriglycidylether, 500 g, was dissolved in isobutanol, 200 g, and the catalyst, tetra-n-butylammonium bromide, 10 g, was added. This mixture was heated to 100° C. and a steady stream of carbon dioxide gas was bubbled through the reaction mixture. The extent of reaction was monitored both by infrared spectroscopy and by epoxide titration. When the reaction had proceeded to greater than 95%, as determined by titration, the gas flow was stopped. This yielded a tri-cyclic carbonate crosslinker.

EXAMPLE 4

Preparation of a Cathodic Emulsion According to the Invention

To a gallon vessel were added 438 g of the resin from Example 1, 173.6 g of benzoguanamine (Cytec's Cymel 1123) and 36.4 g of the carbonate crosslinker from Example 3. This was mixed until homogenous. To this was added 11.2 g zinc nitrate (0.6 H20), 15 g DI water, 11.2 bismuth octoate (King K-KAT 348), 0.5 surfactant 104BC (Air Products), and 0.5 flow additive (K2000 from BYK Chemie). This was mixed until homogeneous and 30.6 g 88% lactic acid added. This was mixed until homogenous. A total of 2148 g deionized water was added in portions with good mixing. The resulting emulsion (TSDA41418) had a solids content of 20%. The pH was 5.3 and the conductivity was 1845 micromhos. The emulsion had a particle size of 0.10 microns. The meq acid was 0.52 and the meq base was 0.55 for a neutralization of 95%.

EXAMPLE 5

Part A: Preparation of Electrocoat Bath

To a gallon vessel were added 2500 g of principal emulsion from Example 4 and 217.1 g of the pigment paste from Example 3. The bath was diluted with 467 g DI water.

The bath had a pigment binder ratio of 0.2 and a solids content of 20%. The bath was mixed for 2 hours in an open vessel. The bath had a pH of 5.4 and a conductivity of 1777 micromhos.

Part B: Deposition of Cathodic Bath

Using a DC rectifier a 4"×12" steel panels were coated via cathodic electrodeposition. The set voltage was 117 volts and 1.0 amps for 2.5 minutes. The bath temperature was 90° F.

Part C: Results

The panels were baked at 30'×280° F. and 30×310° F. in a gas oven. The cured films had a good smooth, continuous appearance and the film build was 0.8 mil. The solvent resistance was good and passed the 100 MEK rubs test.

I claim:

1. A cathodic electrocoat coating composition comprising an aqueous dispersion of
   (a) a polymer comprising a polymer backbone having appended thereto at least one carbamate functional group, said first component represented by randomly repeating units according to the formula:

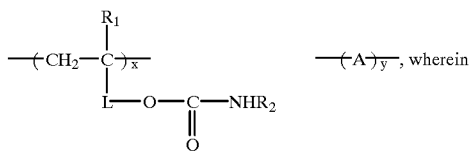

$R_1$ represents H or $CH_3$,
   $R_2$ represents H, alkyl, or cycloalkyl,
   L represents a divalent linking group,
   A represents repeat units comprising at least one repeat unit having at least one primary amine group salted with an acid,
   x represents 10 to 90 weight %, and
   y represents 90 to 10 weight %,
   (b) a compound having a plurality of functional groups that are reactive with said carbamate groups, and
   (c) a curing agent having a plurality of cyclic carbonate groups.

2. The cathodic electrocoat composition of claim 1 wherein the primary amine group is blocked with a ketone.

3. The cathodic electrocoat composition of claim 2 wherein the polyepoxide is a triepoxide.

4. The cathodic electrocoat composition of claim 3 wherein the repeat unit A having at least one primary amine group, comprises the group —N(CH$_2$CH$_2$NH$_2$)$_2$ blocked with ketamine groups.

5. The cathodic electrocoat composition of claim 3 wherein the repeat unit A having at least one primary amine group, comprises the group —N(CH$_2$CH$_2$NH$_2$)$_2$ salted with an acid.

6. The cathodic electrocoat composition of claim 1 wherein A further comprises repeat units having an amino group selected from the group consisting of secondary, tertiary amino groups or a mixture thereof.

7. The cathodic electrocoat composition of claim 1, wherein the curing agent (c) is the reaction product of a polyepoxide and carbon dioxide.

8. The cathodic electrocoat composition of claim 1 having a number average molecular weight of from about 2000 to 100,000.

9. The cathodic electrocoat composition of claim 8 having a number average molecular weight of from about 10,000 to 60,000.

10. The cathodic electrocoat composition of claim 1 having a meq range of from 0.5 to 2.0.

11. The cathodic electrocoat composition of claim 10 having a meq range of from 0.8 to 1.5.

12. A cathodic electrodeposition method, comprising
   1) immersing a conductive substrate in a coating composition comprising, in an aqueous medium:
      (a) a polymer backbone having appended thereto at least one carbamate functional group, said first component represented by randomly repeating units according to the formula:

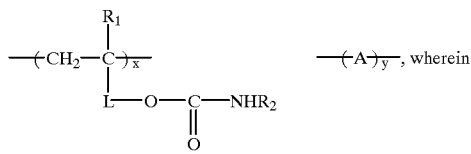

$R_1$ represents H or $CH_3$,
      $R_2$ represents H, alkyl, or cycloalkyl,
      L represents a divalent linking group,
      A represents repeat units comprising at least one repeat unit having a pendant primary amine group,
      x represents 10 to 90 weight %, and
      y represents 90 to 10 weight %,
      (b) a compound having a plurality of functional groups that are reactive with said carbamate groups, and
      (c) a curing agent having a plurality of cyclic carbonate groups,
   2) applying a voltage between an anode and the conductive substrate to coat the substrate, and
   3) removing the coated substrate from the coating composition.

13. The method of claim 12 wherein the at least one repeating unit A having a pendant primary amine group comprises the primary amine group which is salted with an acid or blocked with a ketamine group.

14. The method of claim 12 further comprising rinsing the coated substrate.

15. The method of claim 12 further comprising baking the coated substrate at a temperature of from 200° to 300° F.

16. The method of claim 12 wherein the conductive substrate comprises metal.

17. The method of claim 16 wherein the metal is selected from the group consisting of aluminum and steel.

18. The method of claim 12 wherein the curing agent (c) is the reaction product of a polyepoxide and carbon dioxide.

19. A cathodic electrocoat coating composition comprising an aqueous dispersion of
   (a) a polymer having a polymer backbone having appended thereto at least one carbamate functional group, said polymer represented by randomly repeating units according to the formula:

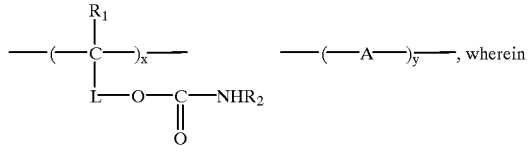

$R_1$ represents H or $CH_3$,
   $R_2$ represents H, alkyl, or cycloalkyl,
   L represents a divalent linking group, A represents repeat units comprising at least one repeat unit having a pendent cationic salting site, x represents 10 to 90 weight %, and y represents 90 to 10 weight %, (b) a compound having a plurality of functional groups that are reactive with said carbamate groups, wherein the repeat units A having a pendant cationic salting site are reacted with an acid (c) a curing agent having a plurality of cyclic carbonate groups.

* * * * *